US012609845B2

(12) United States Patent
Legatski et al.

(10) Patent No.: US 12,609,845 B2
(45) Date of Patent: \*Apr. 21, 2026

(54) COMMAND DETERMINATION FOR VIRTUAL MEETINGS USING GAZE AND HAND GESTURES

(71) Applicant: Zoom Video Communications, Inc., San Jose, CA (US)

(72) Inventors: Richard Dean Legatski, Castle Rock, CO (US); Thanh Le Nguyen, Belle Chasse, LA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/774,240

(22) Filed: Jul. 16, 2024

(65) Prior Publication Data
US 2024/0372741 A1 Nov. 7, 2024

Related U.S. Application Data

(63) Continuation of application No. 17/986,310, filed on Nov. 14, 2022, now Pat. No. 12,074,722.

(51) Int. Cl.
*H04L 12/18* (2006.01)
*G06F 3/01* (2006.01)

(52) U.S. Cl.
CPC .......... *H04L 12/1822* (2013.01); *G06F 3/013* (2013.01); *G06F 3/017* (2013.01)

(58) Field of Classification Search
None
See application file for complete search history.

(56) References Cited

U.S. PATENT DOCUMENTS

| | | | | |
|---|---|---|---|---|
| 10,346,985 B1 * | 7/2019 | Poliakov | .................. | G06T 7/11 |
| 10,860,098 B1 * | 12/2020 | Stratton | ............... | G06V 40/193 |
| 2004/0193413 A1 * | 9/2004 | Wilson | ................. | H04N 13/239 |
| | | | | 382/209 |
| 2013/0138424 A1 * | 5/2013 | Koenig | ................... | G10L 21/00 |
| | | | | 704/9 |
| 2016/0005281 A1 * | 1/2016 | Laska | ................ | G08B 13/1961 |
| | | | | 348/143 |
| 2018/0321754 A1 * | 11/2018 | Lesner | ................... | H04L 67/025 |
| 2018/0376217 A1 * | 12/2018 | Kahng | ............. | H04N 21/41407 |
| 2019/0361694 A1 * | 11/2019 | Gordon | ................... | G06F 9/452 |
| 2020/0304713 A1 * | 9/2020 | Zhao | ........................ | H04N 7/15 |

(Continued)

*Primary Examiner* — Phyllis A Book

(74) *Attorney, Agent, or Firm* — Kilpatrick Townsend & Stockton LLP

(57) ABSTRACT

Techniques for command determination for virtual meetings using gaze and hand gestures are disclosed. In an example method, a client device initiates a virtual meeting to which a number of client devices are connected. The virtual meeting is configured with a designation of a user of the client device as either a hearing-impaired user or a sign language interpreter. The client device determines an indication of a command using a determined command mode based on a first video stream captured by a first camera and a second video stream captured by a second camera, the first and second cameras communicatively coupled to the client device. The client device updates one or more configurations of the virtual meeting based on the indication of the command.

18 Claims, 10 Drawing Sheets

(56) References Cited

U.S. PATENT DOCUMENTS

| | | | |
|---|---|---|---|
| 2021/0405865 A1* | 12/2021 | Faulkner | H04N 7/147 |
| 2022/0182708 A1* | 6/2022 | Ward | H04N 21/4858 |
| 2023/0115250 A1* | 4/2023 | Scallon | G06F 3/0482 |
| | | | 715/204 |
| 2023/0147584 A1* | 5/2023 | Asgekar | H04L 65/1083 |
| | | | 382/103 |
| 2023/0156314 A1* | 5/2023 | Sztuk | G02B 27/0093 |
| | | | 348/222.1 |
| 2023/0280835 A1* | 9/2023 | McDaniel | G06F 3/016 |
| | | | 345/156 |
| 2023/0384913 A1* | 11/2023 | Hassan | H04L 51/216 |
| 2024/0106969 A1* | 3/2024 | Thomasian | G06V 20/41 |

* cited by examiner

600

602  Initiate Virtual Meeting

604  Load Control Panel Overlay

606  Interaction with the Control Panel?

608  Receive Control Selection

610  Update Virtual Meeting

N

Y

COMMAND DETERMINATION FOR VIRTUAL MEETINGS USING GAZE AND HAND GESTURES

CROSS-REFERENCE TO RELATED APPLICATIONS

This application is a continuation of U.S. patent application Ser. No. 17/986,310 filed on Nov. 14, 2022, and entitled "Sign Language Control For A Virtual Meeting," the entirety of which is incorporated herein by reference.

FIELD

The present disclosure relates generally to providing assistance to impaired users within a virtual conferencing system, and more particularly, to providing assistance to hearing-impaired users to control the virtual conferencing system while using sign language.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to providing assistance to impaired users communicating within a video conferencing system, and more particularly, to providing assistance to hearing-impaired users in controlling the video conferencing system. There are a number of controls a user may wish to access during a video conference, such as mute on/off, video on/off, record, etc. When using sign language, any instances in which a user needs to pause their hand signing to control a setting, it can cause delays in the conversation and the end users lose momentum of the meeting. The systems and methods of the present disclosure allow users to use their hands to activate pre-programmed execution of the various controls (e.g., mute, unmute, record, turn camera on/off, etc.) without interrupting their conversation is needed. Therefore, a user that is performing sign language can also use their hands to enter commands into the client for the virtual meeting without having stop using their hands to control an input device (e.g., mouse, keyboard, phone, etc.).

The detection of the user's hands to perform control inputs can be performed using a variety of systems and methods. One example includes implementing an overlay of the controllers on the screen in which the user can interact with to activate any of the controls. In another example, the camera can have a predefined area that will be utilized to take access various controls. In a further example, a user can implement multiple cameras which can be separately dedicated for video conferencing and controls input. Any combination of methods can be used to assist the user in controlling the video conferencing settings while using sign language, as discussed in greater detail herein. The discussion of the present disclosure notes both sign language and hand singling interchangeably, such that any of the embodiments or examples specifically referencing one of sign language and hand singling could be used similarly as if the other phrase were used.

System Overview

Figure 1:
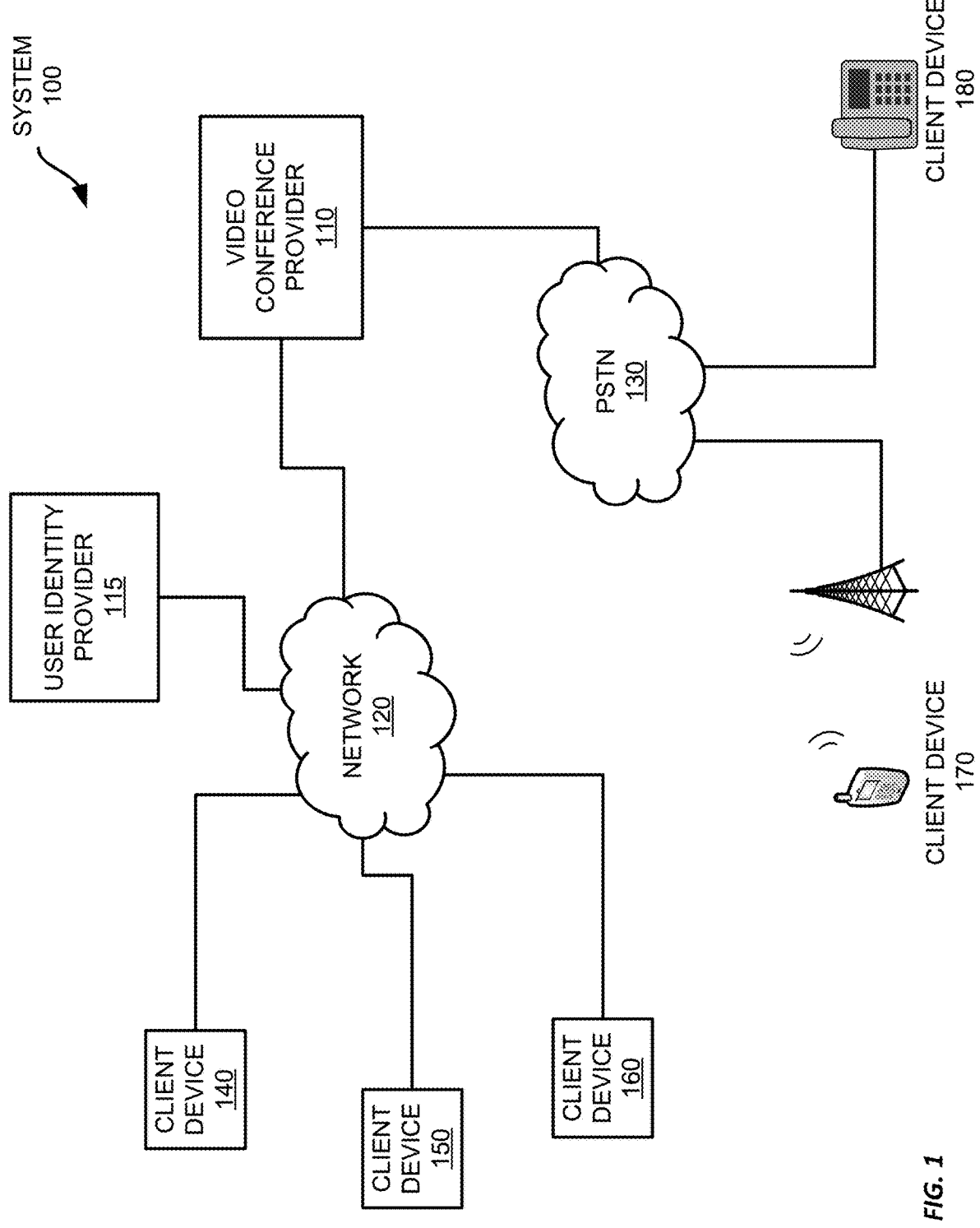
FIG. 1 is an illustration depicting an example video conferencing system in accordance with various embodiments.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2A:
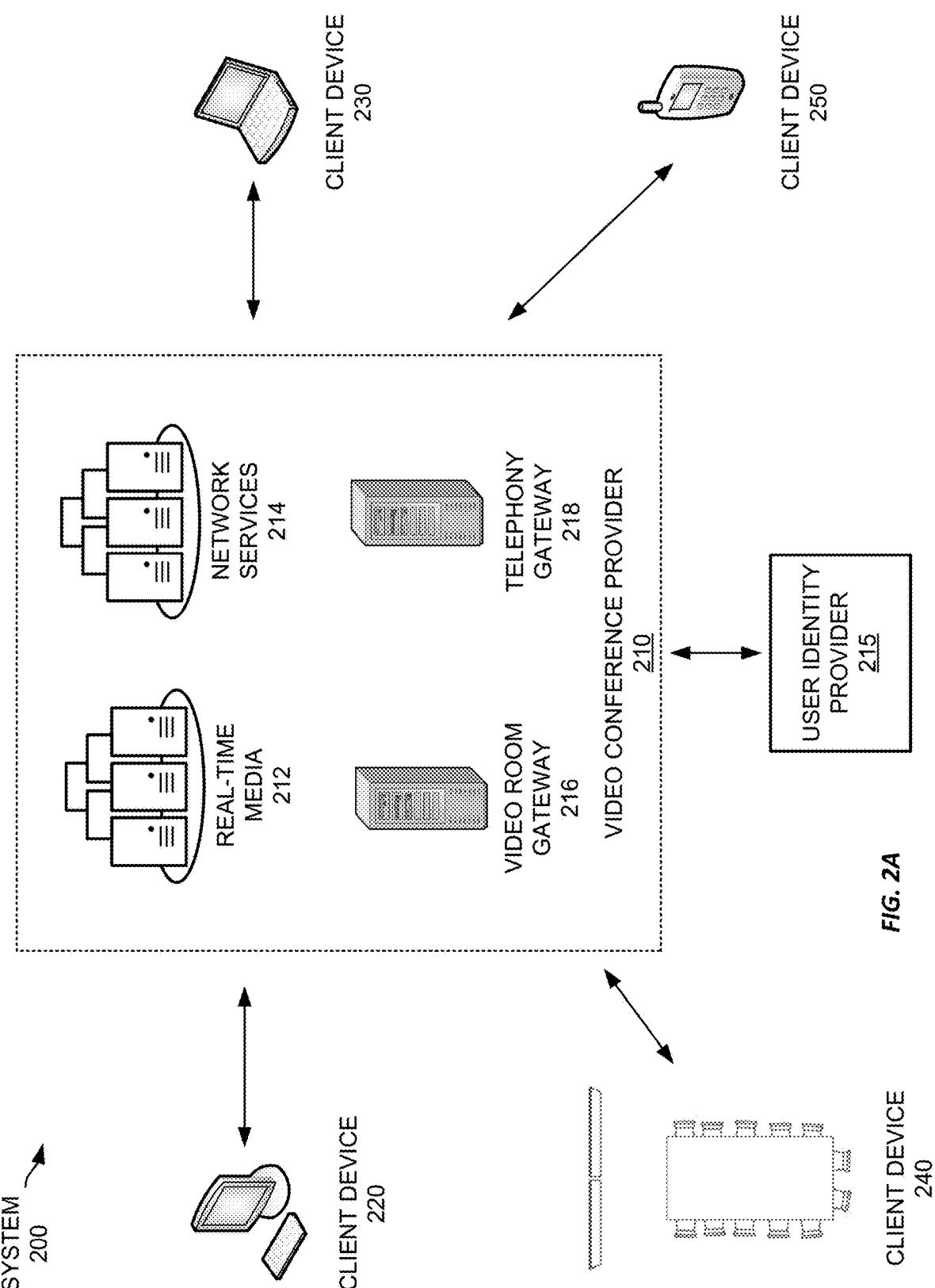
FIG. 2A is an illustration depicting an example video conferencing system in accordance with various embodiments.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2A, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2A, FIG. 2A shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2A. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 2B:
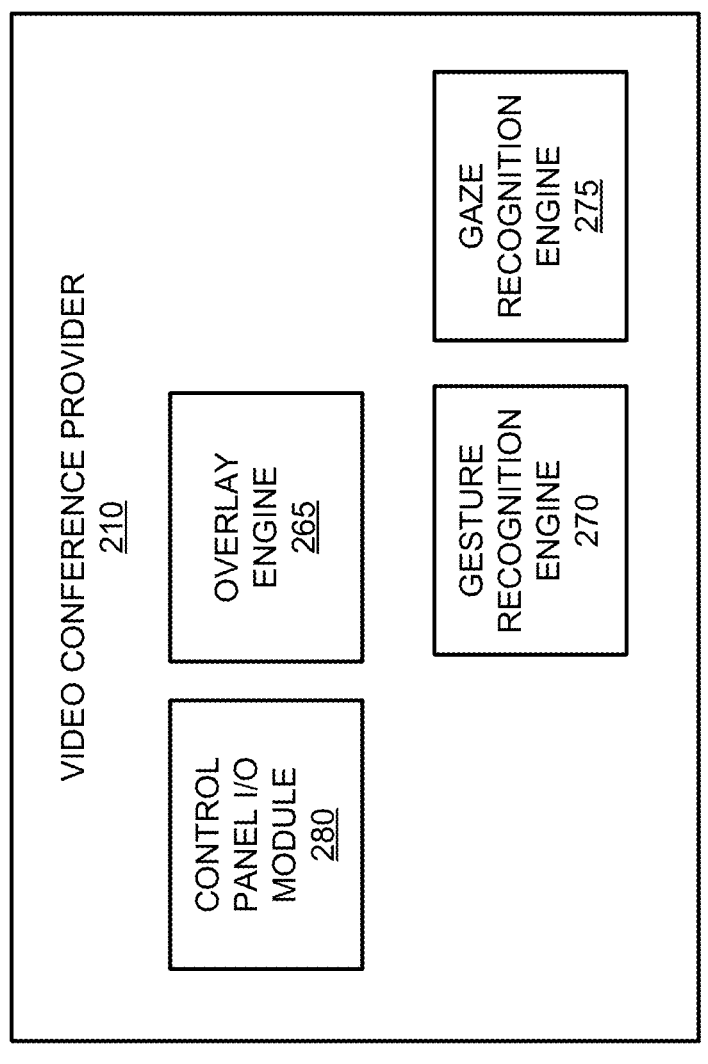
FIG. 2B is an illustration depicting an example video conference provider in accordance with various embodiments.

Referring now to FIG. 2B, FIG. 2B shows an example of components included within a video conference provider 210. The video conference provider 210 includes any combination of an overlay engine 265, a gesture recognition engine 270, a gaze recognition engine 275, and a control panel module 280. Each of the overlay engine 265, the gesture recognition engine 270, the gaze recognition engine 275, and the control panel module 280 can be provide on any combination of the servers or clients, for example, depicted in systems 100, 200. In some embodiments, the overlay engine 265 can be configured to generate and display an accessible control panel through which a user can view and interact one or more controls. The accessible control panel can be provided as part of a graphical user interface (GUI) through which a user is participating within a virtual meeting.

Figure 4:
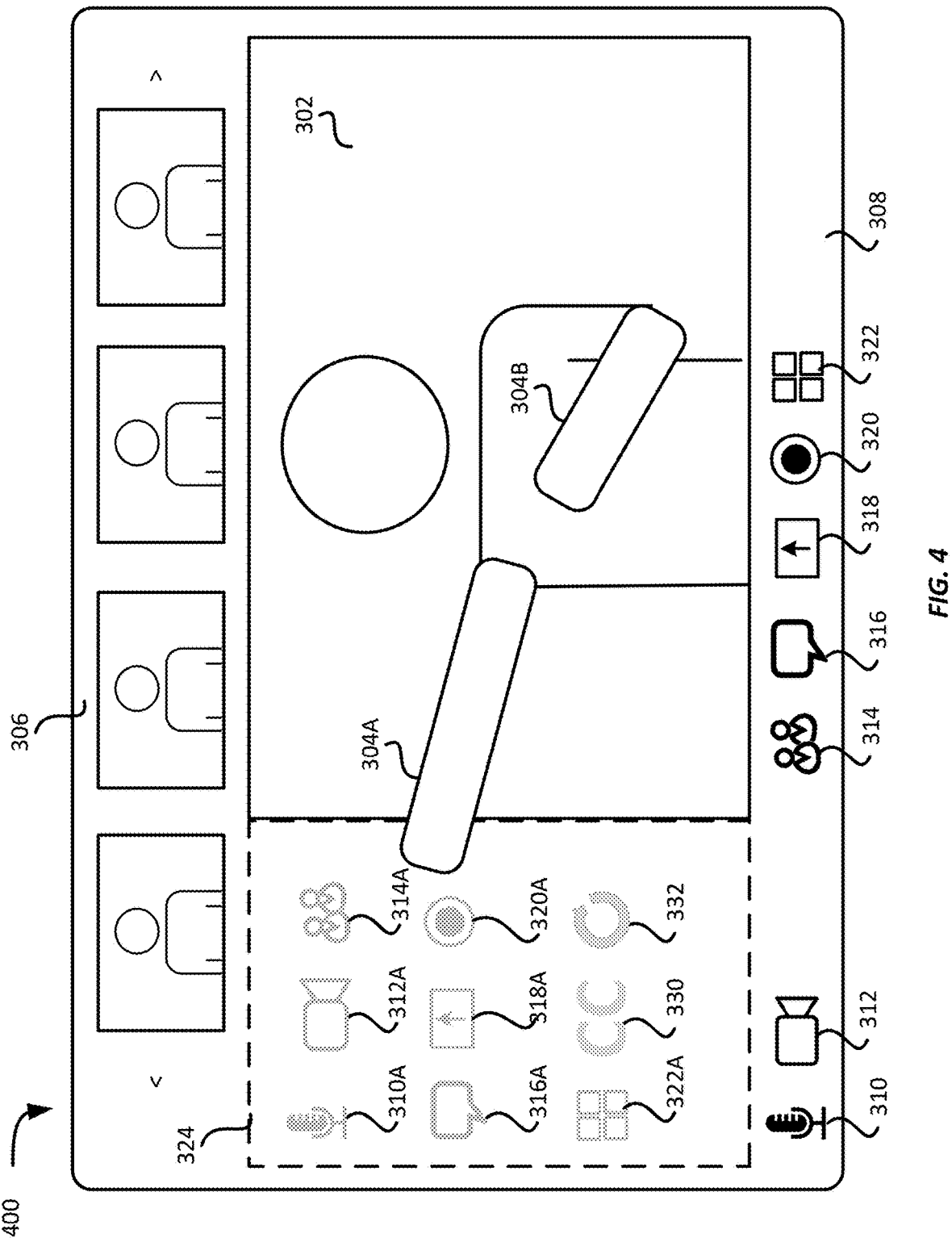

The accessible control panel can include any combination of controls and can be interacted with by the user in any combination of methods. For example, the overlay engine 265 can generate an accessible control panel that is displayed within the GUI on a client display device. The user can interact with the accessible control panel generated by the overlay engine 265 by using their hands within a video feed to select different controls. For example, a user's movements can be captured by a digital camera and the user can view themselves in a video feed and move their hand(s) to a location within the rendered accessible control panel to select one or more controls (e.g., as shown in FIG. 4). The hand movements can be tracked and interpreted using any combination of methods, for example, comparing the tracked hand movements against pre-programmed hand control signals.

In some embodiments, the gesture recognition engine 270 can be configured to track and interpret movements made by a user. For example, a user's movements can be captured by a digital camera and the gesture recognition engine 270 can interpret those movements. The interpretation of the movements can be performed using any combination of pattern recognition, for example, using artificial intelligence, machine learning, neural networks, etc. The interpretation of the movements can be used to identify a predetermined gesture or a particular word or phrase command provided in sign language. For example, if a user signs, open control panel or mute conversation, the gesture recognition engine 270 will detect the user performing sign language and identifying those specific phrases.

In some embodiments, the gaze recognition engine 275 can be configured to track and interpret a gaze of a user. For example, a viewing direction or gaze of the user can be captured by a digital camera and the gaze recognition engine 275 can interpret the viewing direction of the user's gaze. The gaze can be determined using any combination of factors, such as for example, head positioning, retina detection, pupil detection, etc. The interpretation of the gaze can be performed using any combination of pattern recognition, for example, using artificial intelligence, machine learning, neural networks, etc. In some embodiments, the gaze recognition engine 275 can receive input from a plurality of digital cameras such that the gaze recognition engine 275 can determine which of the plurality of digital cameras (if any) that the user is looking toward. In some embodiments, the gaze recognition engine 275 can determine an action based on a facial expression of a user. For example, the gaze recognition engine 275 can recognize that a user is looking in a particular direction and, in response to that recognition, provide the user with a predetermined selection of on-screen buttons for the user to interact with, such as based on a virtual option or menu of options that is visually presented in the direction the user is looking. In some embodiments, the gaze recognition engine 275 can be implemented with a single camera, such that the gaze recognition engine 275 can detect when the user looks at certain part of the screen, which can cause a predetermined selection of on-screen buttons for the user to interact with to overlayed on the video feed.

The control panel module 280 can be configured to provide a mechanism to receive and process one or more controls or commands received from a user input. The user input can be received through any combination of methods. For example, the input can be through an input device, through verbal commands, through gestures, or a combination thereof. In some embodiments, the inputs for the control panel module 280 are provided from an input associated with at least one of the overlay engine 265, the gesture recognition engine 270, and the gaze recognition engine 275. For example, the input can be a user interaction with an overlay generated by the overlay engine 265, a gesture detected by the gesture recognition engine 270, or a viewing direction detected by the gaze recognition engine 275. Once a user input is received, one or more functions can be performed. For example, if a user inputs an option to mute their microphone, then the control panel module 280 will provide the instruction to the virtual meeting client.

Although the overlay engine 265, the gesture recognition engine 270, the gaze recognition engine 275, and the control panel module 280, are discussed with respect to the video conference provider 210, all of some of these components can be included within any of the client devices 220, 230, 240, 250. Additionally, each of the overlay engine 265, the gesture recognition engine 270, the gaze recognition engine 275, and the control panel module 280 can be implemented individually or in combination. For example, if a user is using two cameras, the gaze recognition engine 275 can use input from the cameras to determine where a user is looking, and the gesture recognition engine 270 can track and identify gestures made by the user into the camera that the user is looking at.

Figure 3:
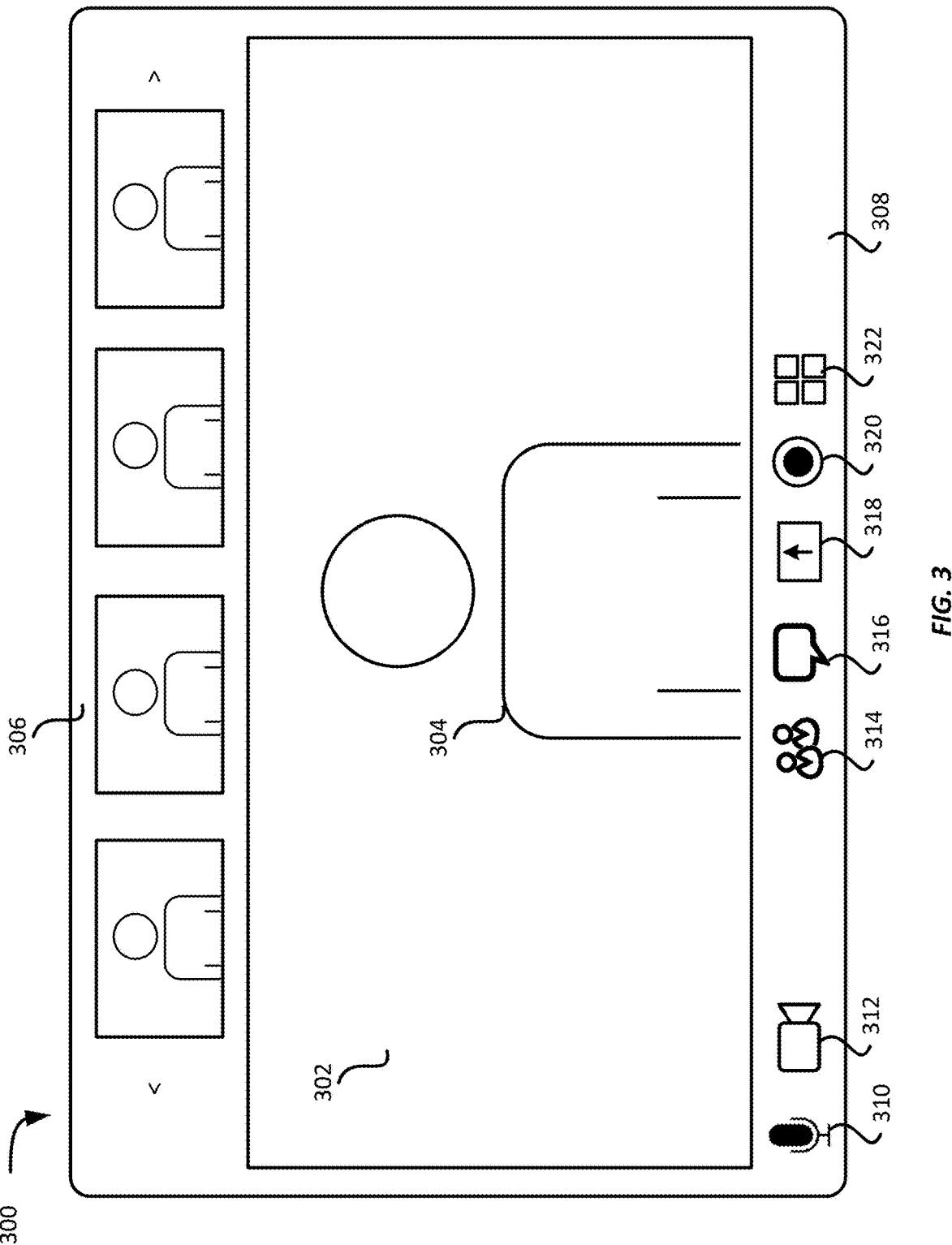
FIGS. 3, 4, 5A, and 5B are illustrations of example graphical user interfaces ("GUIs") in accordance with various embodiments.

Referring now to FIG. 3, FIG. 3 shows an example graphical user interface (GUI) 300 that a user's (or participant's) client device may display while interacting with another participant during a virtual meeting in a conversation. A client device, e.g., client devices 220-250, executes video conferencing software, which in turn displays the GUI 300 on the client device's display. In this example, main viewing area 302 (or first viewing area) may display various images, depending on the configuration of the GUI 300 chosen by the videoconference participant. In this example, main viewing area 302 is displaying an image of the current or active speaker 304 in a videoconference. The GUI 300 also includes a gallery strip 306. Gallery strip 306 displays thumbnail images of the most recent speakers in the videoconference. The GUI 300 also includes a toolbar 308 that includes various user controls 310-322, as examples, controls for video devices, microphones, chat functions, gesture functions, and recording functions. Controls 310, 312 may allow the participant to toggle on or off audio or video streams, respectively, captured by a microphone or camera connected to the client device. Control 314 allows the participant to view any other participants in the video conference with the participant, while control 316 allows the participant to send text messages to the other participants. Control 318 allows the participant to share content from their client device. Control 320 allows the participant to toggle recording of the meeting, and control 322 allows the user to select an option to join a breakout room, though in this example, with only two participants, breakout room functionality may be disabled. Control 330 allows the participant to toggle closed captioning and control 332 allows the participant to switch between interpreters participating within the virtual meeting.

Referring now to FIG. 4, FIG. 4 shows an example GUI 400 that a user's (or participant's) client device may display while interacting with an accessible control panel 324. The GUI 400 in FIG. 4 can be used by any participants, but it can be specifically designed to provide assistance to hearing-impaired users during a virtual conference. Specifically, the GUI 400 in FIG. 4 is designed such that a hearing-impaired user can use their hands within an augmented environment to activate soft button versions of the controls 310A-322A on their client, as an alternative to using a mouse or keyboard to access controls 310-322 of the toolbar 308. The accessible control panel 324 can be provided as an overlay over the main viewing area 302, it can be a masked off section of the main viewing window 302, or in a separate window from the main viewing area 302. Interaction with the overlay can be provided using any combination of methods. For example, the overlay could be implemented as part of an augmented reality, mixed reality, and/or virtual reality. In another example, video images captured by the camera be used by a client to detect user interaction on top of virtual overlay buttons, such that the client will be interpreting camera input data to determine whether any combination of movement and eye detection in a predefined area proximate to a control 310A-322A. In some embodiments, the accessible control panel 324 is provided as an additional layer within the display of the GUI 400. The additional layer can be provided such that only the user electing to enable the accessible control panel 324 can see it within their field of view but may not be visible to other users. Specifically, the accessible control panel 324 should be provided in a manner such that the user can visualize themselves interacting with the controls within the accessible control panel 324 within the video feed while other users may not see what they user is doing. For example, when interacting with the accessible control panel 324, the user's first hand 304A may be offscreen (to other participants in the virtual meeting) while interacting with the controls, whereas their second hand 304B may be visible to the other participants. This functionality can be implemented using any combination of methods. For example, a digital crop can be employed such that the entire video will be received by the provider 210 and/or other participants, but the predefined section for the controls overlay of the video feed will digitally cropped from the video feed to omit that view from the other participants.

In some embodiment, the control panel 324 includes all of the same controls as the toolbar 308, as shown in FIG. 4. For example, the functionality of control 310 on toolbar 308 corresponds to the same functionality of control 310A in on the control panel 324. In other embodiments, the accessible control panel 324 can have less controls or specific controls to the user preferences. For example, a reduced number of controls in the accessible control panel 324 may improve accuracy and efficiency of a user to interact with those control. In some embodiments, the controls within the accessible control panel 324 can be partially transparent such that any video layers beneath the accessible control panel 324 have a higher visibility. For example, the controls within the accessible control panel 324 can have a transparency of about 30%. The accessible control panel 324 can be accessed by a user when they are the active speaker 304 or when they are not the active speaker. In some embodiments, the accessible control panel 324 is visible only to the user using the controls, even when they are the active speaker 304, such that other participants within a virtual meeting will not see the accessible control panel 324 or see the user interacting with the accessible control panel 324. Instead, for example, the other participants would see the GUI 300 as presented in FIG. 3. The other participants may see the user moving their hand offscreen but may not see them interacting with the controls in the accessible control panel 324. This enables the user to continue to provide hand signaling communications while also being able to provide control inputs without having to move their hands to access another input device (e.g., mouse) to select a control input (e.g., from toolbar 308).

Figure 5A:
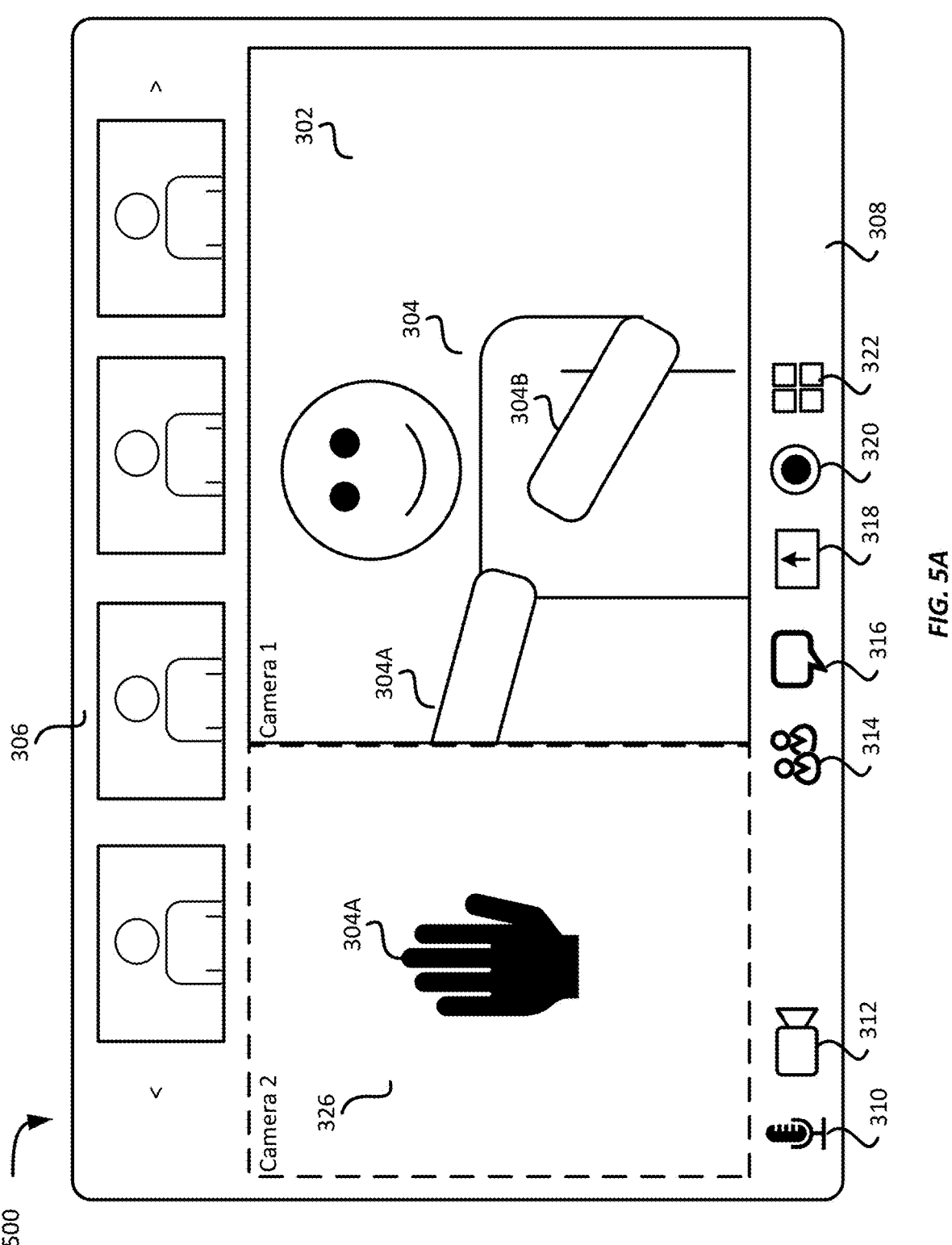

Referring now to FIG. 5A, FIG. 5A shows an example GUI 500 that a user's (or participant's) client device may display while interacting with a dual camera configuration, each of the cameras having their own field of view. The GUI 500 in FIG. 5A can be used by any participants, but it can be specifically designed to provide assistance to hearing-impaired users during a virtual conference. Specifically, the GUI 500 in FIG. 5A is designed such that a hearing-impaired user can use a first camera for communicating using sign language and a second camera to provide hand gestures for activating controls 310-322 on their client, as an alternative to using a mouse or keyboard to access toolbar 308. In some embodiments, when using two cameras, each of the cameras can be dedicated for capturing video images for a particular task and can include its own viewing window 302, 326 within the GUI 500. The tasks can be defined by the user, and both can be displayed in any orientation within the GUI 500. For example, a first camera (Camera 1), associated with a first digital camera, can be designated for communication during a virtual meeting while a second camera (Camera 1), associated with a second digital camera, can be designated for input controls during a virtual meeting. In this example, the first camera can be positioned to capture the user's face 304C and hands, while the second camera can be positioned at a location outside of the view of the first camera and oriented to capture hand gestures.

In some embodiments, the second camera can capture video images of hand gestures of the user and the client can display the captured gestures on a second viewing window 326 within the GUI 500 such that the user can orientate their gestures to ensure they are being captured appropriately. The second viewing window 326 can be provided such that only the user electing to enable the gesture control input can see it within their field of view. For example, when provide gesture-based control inputs, the user's first hand 304A may be offscreen (providing the control gesture) to other participants in the virtual meeting, whereas their second hand 304B may be visible to the other participants. This enables the user to continue to provide hand signaling communications while also being able to provide control inputs without having to move their hands to access another input device (e.g., mouse) to select a control input (e.g., from toolbar 308).

Figure 5B:
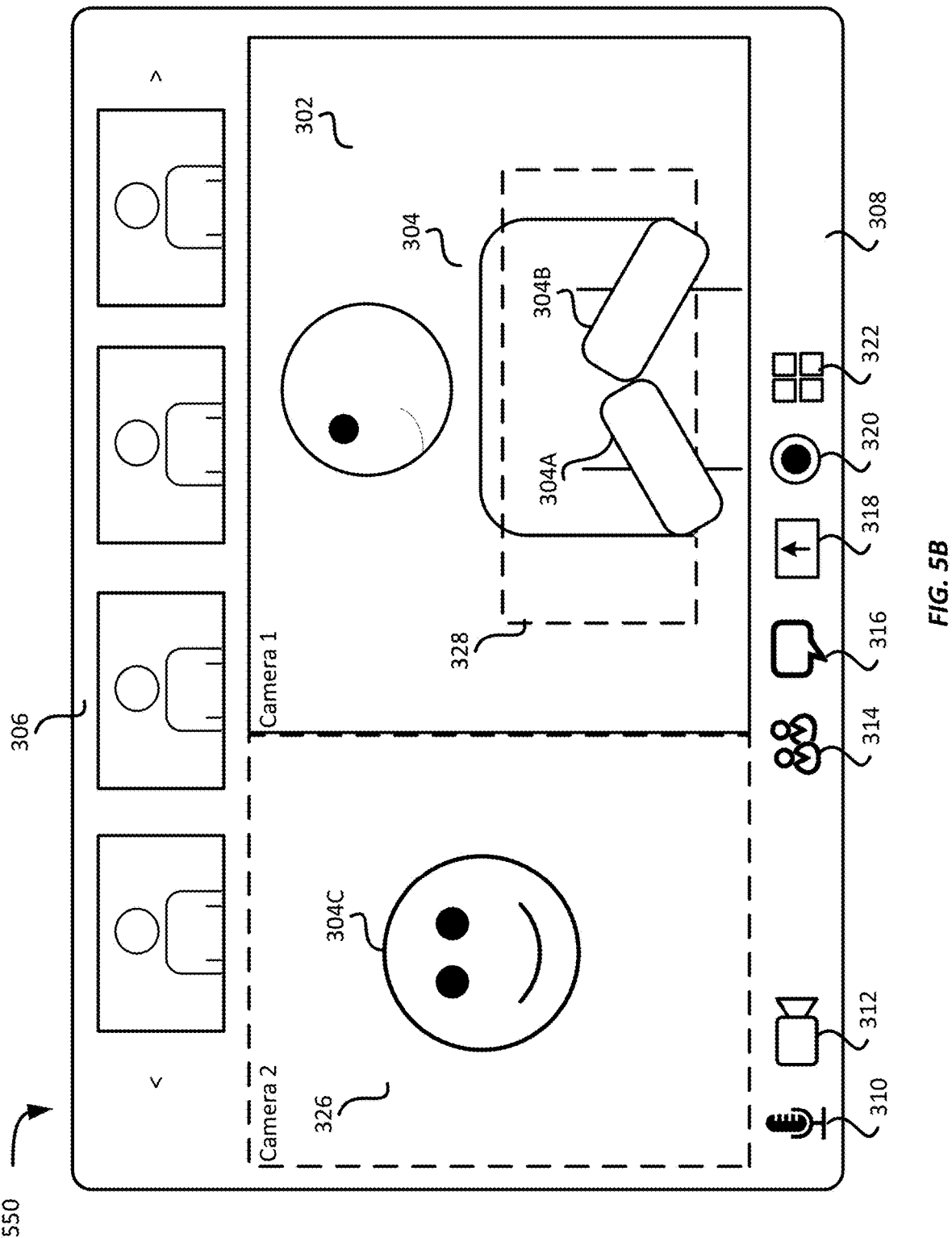

Referring now to FIG. 5B, FIG. 5B shows another example GUI 550 that a user's (or participant's) client device may display while interacting with a dual camera configuration. The GUI 550 in FIG. 5B can be used in a similar manner as the GUI 550 discussed with respect to FIG. 5A. Specifically, the GUI 550 in FIG. 5B is designed as part of an implementation which enables a hearing-impaired user to be able to a gaze into the first camera to indicate (to a client device) that their hand gestures should be used for communication and a gaze into the second camera to indicate that their hand gestures should be used for activating controls 310-322 on their client. The camera configuration and operation can be used in a similar manner as discussed with respect to FIG. 5A. For example, gazing into a first camera (Camera 1), associated with a first digital camera, can designate for communication during a virtual meeting while gazing into a second camera (Camera 1), associated with a second digital camera, can designate for input controls during a virtual meeting. In this example, the first camera can be positioned on the user's face 304C and hands 304A, 304B, while the second camera can be positioned at a second location that the user can gaze (e.g., left or right).

In some embodiments, the second camera can capture video images of a gaze of the user and the client can display the captured gaze on the second viewing window 326 within the GUI 550 such that the user can orientate their gaze to ensure they are providing the appropriate function (e.g., communication or control). The second viewing window 326 can be provided such that only the user electing to enable the gaze control input can see it within their field of view. This enables the user to continue to provide hand signaling communications to other users while also being able to provide control inputs without having to move their hands to access another input device (e.g., mouse) to select a control input (e.g., from toolbar 308). In some embodiments, the GUI 550 can include a layer 328 showing a predefined area in which the user can use hand signaling as an input (e.g., toggling controls). The layer 328 can be provided anytime the user indicates that they need assistance related to sign language, anytime the user gazes toward the second camera (e.g., when they intend to provide commands), through activation of a button or menu setting, or combination thereof.

In some embodiments, the GUIs 300, 400, 500, 550 discussed with respect to FIGS. 3-5B can be implemented along with the overlay engine 265, the gesture recognition engine 270, the gaze recognition engine 275, and the control panel module 280 to provide an improved virtual meeting experience for those with hearing impairments and/or participants (e.g., interpreters) relying on sign language (hand signaling) to communicate with other participants.

Figure 6:
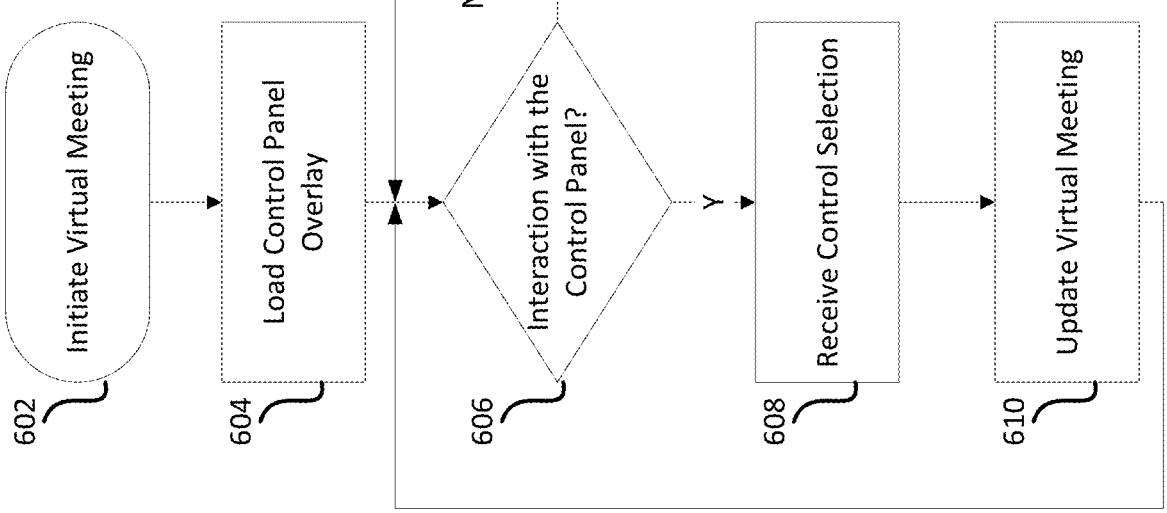
FIG. 6 is a flow chart depicting a process for assisting a hearing-impaired participant in a virtual conference in accordance with various embodiments.
Figure 6:
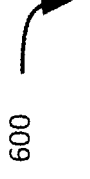

Referring now to FIG. 6, FIG. 6 shows an example method 600 for providing assistance for accessing control inputs during a virtual conference. The method 600 of FIG. 6 can be implemented using the systems 100, 200 shown in FIGS. 1, 2A, and 2B; however, any suitable system according to this disclosure may be employed.

At block 602, a virtual meeting or conference is created and started. Participants of the virtual meeting can communicate with one another through a graphical user interface providing audio and video to the other participants. Examples of a GUI 300, 400, 500, 550 are provided in FIGS. 3-5B. In some embodiments, the initiation of the virtual meeting can include identifying participants that require assistance in the virtual meeting. For example, when accepting a meeting, users can designate themselves as a hearing-impaired user requesting assistance. In another example, at the time of scheduling the meeting, a meeting coordinator can select one or more invitees as hearing-impaired participants.

At block 604, as part of, or after, the designation that a user is hearing-impaired and/or the user requests control assistance, an accessible control panel 324 overlay is loaded within the GUI 300 (e.g., by the overlay engine 265), as shown in FIG. 3. For example, the accessible control panel 324, including controls 310A-322A, 330, and 332, can be provided. The accessible control panel 324 can be provided in response to the indication that the user has a hearing-impairment or in response to the user selecting a control or menu option to load the overlay. In some embodiments, the accessible control panel 324 can automatically launch with a predefined set of controls. The predefined set of controls can include a default configuration for an impaired participant, a predefined set of controls defined in a user profile, and/or can be the same controls provided within the default toolbar 308. In some embodiments, the accessible control panel 324 can include less controls, additional controls, and/or shortcuts to other menu options. The accessible control panel 324 can include controls specific for use by hearing impaired users and/or their interpreters. For example, the accessible control panel 324 can include control 330 to turn on closed captioning and control 332 to switch between interpreters.

In some embodiments, activation of the accessible control panel 324 can be provided in response to a determination that a user is performing sign language. The presence of a participant performing sign language is received or detected using any combination of methods. For example, the system can automatically recognize or detect the usage of sign language using artificial intelligence (AI)/machine learning (ML), pattern recognition, etc. In some embodiments, the accessible control panel 324 overlay is loaded within a predefined space, for example, by the overlay engine 265.

At block 606, the process 600 monitors (e.g., by the overlay engine 265 or gesture recognition engine 270) for user interaction with the accessible control panel 324. The user interaction can be detected using any combination of techniques. In some embodiments, the process 600 monitors for hand detection within the predefined space of the accessible control panel 324. Hand detection can be provided through any combination of methods, for example, by detecting movement within the predefined space, recognizing a hand of a user within the predefined space, etc. If user interaction is detected with the accessible control panel 324, then the process 600 advances to block 608, otherwise, the process 600 returns to monitoring at block 606.

At block 608, a control selection is received (e.g., by control panel input/output module 280). The received control selection can be provided in response to a specific user interaction with the accessible control panel 324. For example, if the user makes a specific gesture or motion proximate to one of the controls within the on-screen accessible control panel 324, then it would be interpreted as a selection of that control. In some embodiments, the specific gesture or more proximate to one of the controls can be captured by the camera (e.g., at the client device). For example, when the accessible control panel 324 is loaded, the client device will monitor video images received from the camera for any interaction to the predefined area(s) where the controls are located with the accessible control panel 324. If the client device detects motion in one of the predefined areas based on the received video images, then one or more commands can be executed, based on the detected motion, gesture, hand signaling, etc. The specific gesture or motion can include actions such as holding hand over for a predetermined period of time, pinching, tapping, circling, signing over a control, etc. Each of these gestures or motions can be preprogramed and learned by the system prior to implementation. In some embodiments, visual confirmation can be provided prior to executing the control (e.g., by the overlay engine 265). For example, a control that the user is interacting with can flash or change in size or color to indicate that it will be activated, such that a user can move their hand (to cancel the action) if they do not want to activate that control. In some embodiments, the GUI could include a cursor or arrow (not depicted) within the control panel 324 that the user can interact with to select a given control, such that the user can visualize which control they are selecting. The cursor or arrow can be provided along with the control panel 324 or upon a detection of user interaction with the control panel 324, such that the cursor or arrow is only visible when the user is reaching into the control panel 324.

At block 610, the selected controls are used to update one or more settings for the virtual meeting (e.g., by control panel input/output module 280). For example, if the user selects the control microphone control 310A, within the accessible control panel 324, to mute themselves, then the audio for that user will be muted to the other participants within the virtual meeting.

The process 600 provides an improved meeting experience for users who require additional assistance and/or who primarily rely on their hands to communicate. For example, users who are participating in a virtual meeting who are using sign language do not want to move their hands to an input device to adjust a setting (e.g., adjust camera, share screen, zoom in, zoom out, mute, etc.) during the meeting. This type of action can be disruptive to the flow of conversation and the overall meeting. By providing the accessible control panel 324 as an alternative input method to the traditional toolbar 308 (which requires a mouse input), a hand signaling user can maintain the flow conversation while having quick access to the virtual meeting settings. It also provides beneficial features to other users. For example, accessible control panel 324 can include a switch control 332 to switch between interpreters mid-conversation (e.g., to give break to one interpreter) without causing a gap in coverage while the user relying on sign language is speaking. Such a transition can happen more seamlessly than having to access other controls to perform this function. This can be useful whether the interpreter is signing back to a hearing-impaired user (speaking to hearing impaired user) or whether they are speaking on their behalf of the hearing-impaired user.

Figure 7:
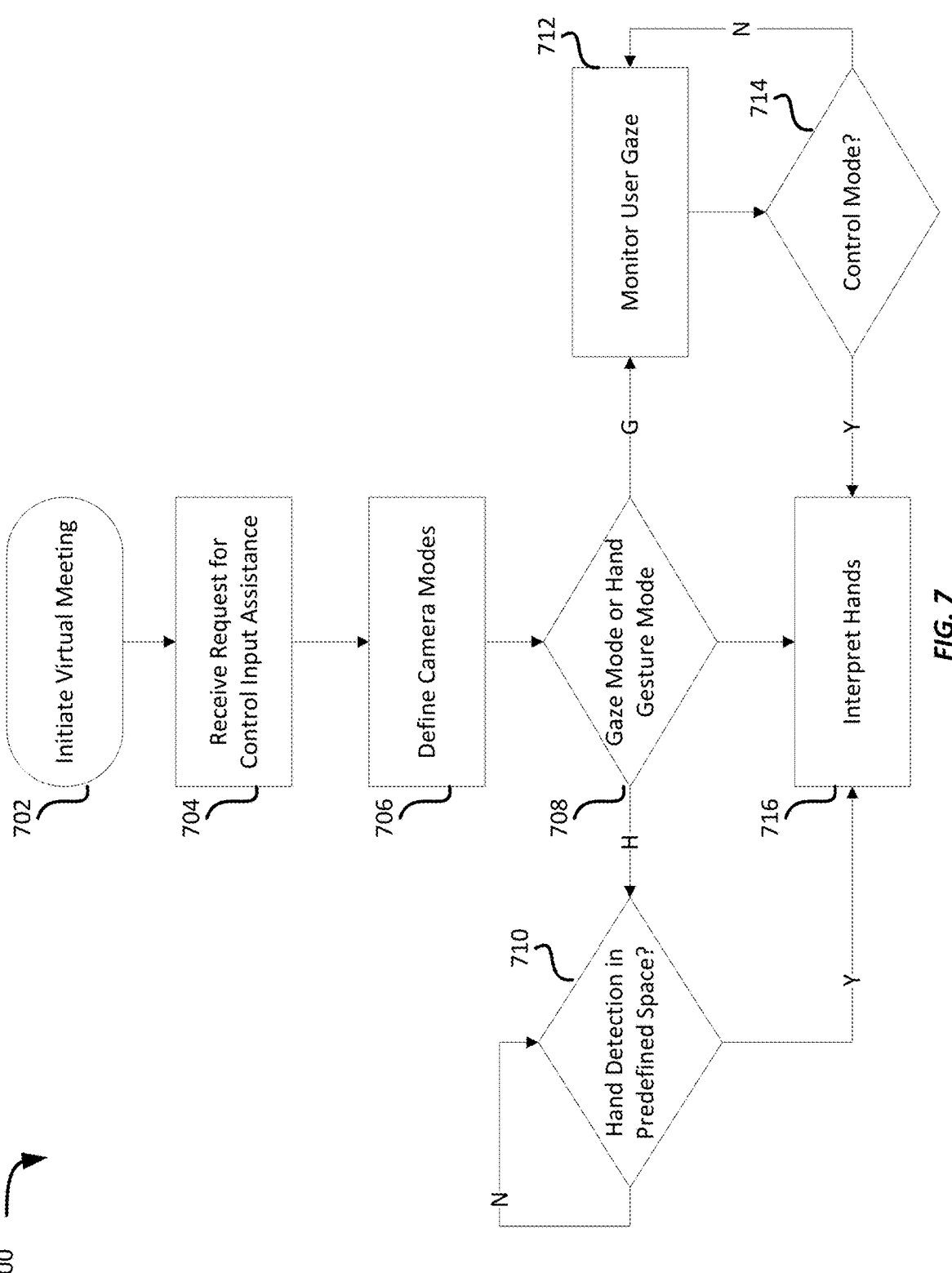
FIG. 7 is a flow chart depicting a process for assisting a hearing-impaired participant in a virtual conference in accordance with various embodiments.

Referring now to FIG. 7, FIG. 7 shows an example method 700 for providing assistance for control inputs during a virtual conference. The method 700 of FIG. 7 can be implemented using the systems 100, 200 shown in FIGS. 1, 2A, and 2B; however, any suitable system according to this disclosure may be employed.

At block 702, a virtual meeting or conference is created and started. In some embodiments, the initiation of the virtual meeting can include identifying specific types of participants either as those that require assistance or those who are designated for providing assistance to others participating in the virtual meeting. For example, when accepting a meeting, users can designate themselves as a hearing-impaired user requesting assistance or as an interpreter to be providing assistance (generally or for another specific invitee). In another example, at the time of scheduling the meeting, a meeting coordinator can select one or more invitees as interpreters for hearing-impaired participants.

At block 704, a request control input assistance is received. The request can be automatically received in response to a determination that a participant is hearing impaired, a participant is assisting a hearing-impaired (e.g., interpreter), or through a request to activate the control input assistance. In some embodiments, the control input assistance can be for multiple camera configurations. For example, hearing impaired users may implement two cameras to implement the control inputs assistance provided by process 700.

At block 706, the camera mode for each of the cameras is defined. The camera modes can include communication mode and control command mode. When in communication mode, the camera can provide video images that would be used as normal for a virtual meeting, for example, displaying the user to the other participants in the virtual meeting. When in control command mode, the camera can provide video images that would be used as an input for one or more controls, for example, hand gesture, hand signaling, sign language, etc. The inputs received at the control command cameras can be interpreted by any combination of the control panel I/O module 280, gesture recognition engine 270 and the gaze recognition engine 275. The process can request that a user designate a camera mode for each of the active cameras. The user can setup the camera designations and change them at any point in time. Once the cameras have been designated, then the GUI 500, 550 can be updated to provide the different views for each of the cameras, for example, as shown in FIGS. 5A and 5B.

At block 708, a determination is made as to whether to implement gaze mode or hand gesture mode. The determination can be made based on any combination of factors. For example, the determination can be based on a user selection of a preference, the mode can be determined on the number of cameras being used, positioning of the cameras, etc. If the determination is that hand gesture mode is active, then the process 700 advances to block 710. If the determination is that gaze mode is active, then the process 700 advances to block 712.

At block 710, the client device 140-160, 220-250 monitors for detection of one or more hands of the user within a predefined space. The monitoring can be performed by the gesture recognition engine 270 to determine when a hand has entered a predefined space, such as the predefined space of the second viewing window 326, as shown in FIG. 5A. If a hand is detected within the predefined space, then the process 700 advances to block 716, otherwise it continues to monitor at block 710.

At block 712, a client device 140-160, 220-250 monitors for detection of a user's gaze toward one or more of each of the active cameras. The monitoring can be performed by the gaze recognition engine 275 to determine when a user is looking into a particular camera, as shown in FIG. 5B. In some embodiments, the process 700 can determine which camera is most likely receiving the user's gaze. The most likely camera can be based using any combination of factors, such as for example, a probability.

At block 714, If it is determined that a user is gazing into a camera set for control command mode, then the process 700 advances to block 716, otherwise it continues to monitor at block 712.

At block 716, the hands of the participant are tracked and interpreted to determine the command that the user is signaling. The gestures being made by the hands can be interpreted by the gesture recognition engine 270 to determine what command the user is conveying. The location being analyzed can be based on which mode that the process 700 is in. For example, if in gaze mode, then the layer 328 would be monitored for hand gestures and if in hand gesture mode, then the viewing area 326 would be monitored for hand gestures. When a gesture is identified as a command, the corresponding controls are used to update one or more settings for the virtual meeting (e.g., by control panel input/output module 280). For example, if the user gestures, within viewing area 326 or layer 328, to toggle the control microphone control 310 to mute themselves, then the audio for that user will be muted to the other participants within the virtual meeting.

The blocks in process 700 can be implemented as shown or they can be separated such that only the blocks associated with the gaze mode or the hand gesture mode are used, based on the desired application. For example, if an application using the gaze mode is desired, the blocks 708 and 710 would not need to be included.

Implementing process 700 provides many advantages for when hearing impaired users participate in a virtual meeting. Conventionally, when a hearing-impaired attendee joins a meeting, it may be difficult for them to adjust settings within the meeting without having to pause their conversation. For example, a user may be using sign language to communicate and wants to start recording, but has to stop signing to grab the mouse and select record on the toolbar 308. This may leave the hearing-impaired user frustrated and unable to interact efficiently or appropriately. In operation, the process 700 would provide the hearing-impaired user with a mechanism (e.g., using hand gestures) to cause their system to toggle a control without having to significantly break their conversation using their hands. This can be faster to do this than to use keyboard/mouse because the user is still looking forward and interacting with what is in front of them rather than refocusing to find mouse, adjust in GUI, etc.

While the operations of processes 600 and 700 are described as being performed by the systems 100, 200, it should be understood that any suitable device may be used to perform one or more operations of this process. Processes 600 and 700 described above) are illustrated as logical flow diagrams, each operation of which represents a sequence of operations that can be implemented in hardware, computer instructions, or a combination thereof. Additionally, the processes 600 and 700 can be implemented independently of in combination, include any combination of steps from either process. Similarly, any of the blocks can be performed by the various components of the system 100, 200. For example, the blocks can be performed on a server or cloud, on a client computing device, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes 600 and 700.

Figure 8:
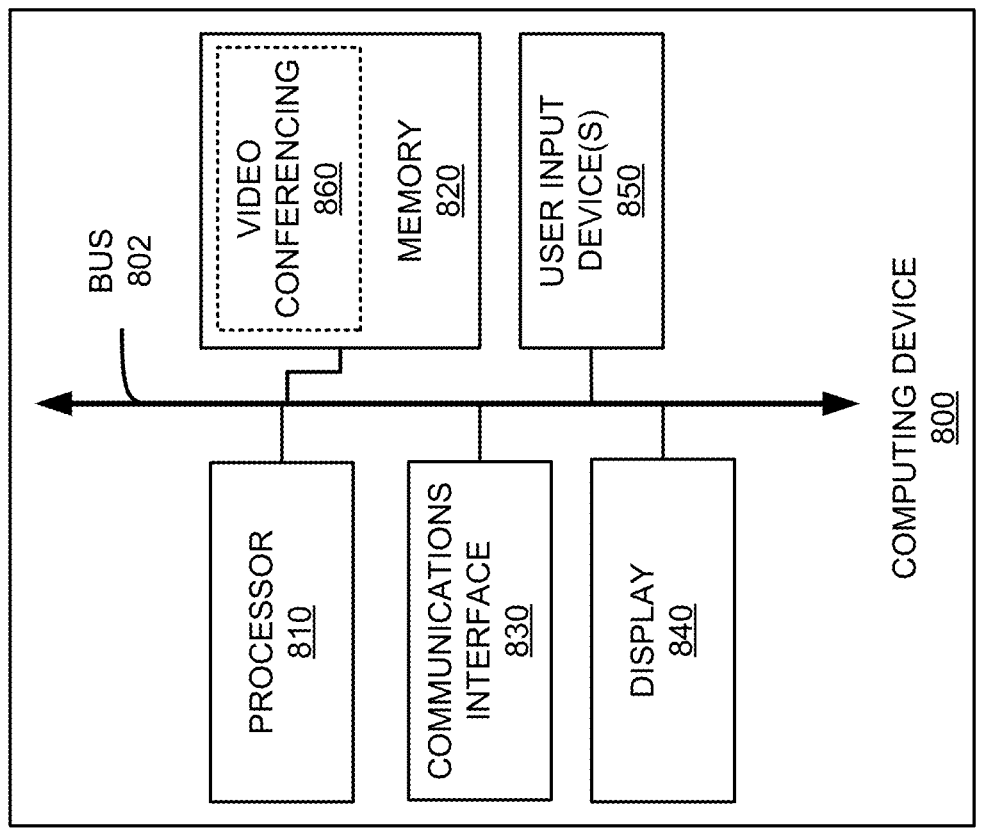
FIG. 8 shows an example computing device suitable for use with systems and methods in accordance with various embodiments.

Referring now to FIG. 8, FIG. 8 shows an example computing device 800 suitable for use in example systems or methods for providing assistance to hearing-impaired users according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for providing assistance to hearing-impaired users according to different examples, such as part or all of the example methods 600, 700 described above with respect to FIGS. 6 and 7. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes a video conferencing application 860 to enable a user to join and participate in a video conference, such as a conventional meeting or webinar, by receiving multimedia streams from a video conference provider, sending multimedia streams to the video conference provider, joining and leaving breakout rooms, engaging in participant interactions during a virtual meeting, etc. such as described throughout this disclosure, etc.

The computing device 800 also includes a communications interface 840. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method, comprising:

initiating, by a client device, a virtual meeting to which a plurality of client devices are connected, wherein the virtual meeting is configured with a designation of a user of the client device as either a hearing-impaired user or a sign language interpreter;

determining, by the client device, an indication of a command corresponding to a preconfigured command mode, wherein:

the client device comprises a dual camera configuration, the dual camera configuration comprising a first camera and a second camera, the first camera and the second camera each connected to the client device; and the indication comprises at least one of a user gaze or a gesture by the user captured in either a first video stream captured by the first camera or a second video stream captured by the second camera; and updating one or more configurations of the virtual meeting based on the indication of the command.

2. The method of claim 1, further comprising determining the preconfigured command mode, wherein the preconfigured command mode is determined based on a first configuration of the first camera and a second configuration of the second camera.

3. The method of claim 1, wherein the preconfigured command mode is a user gaze mode.

4. The method of claim 3, wherein the indication of the command comprises:

a first gaze by the user identified in the first video stream captured by the first camera; and a first hand gesture by the user identified in the second video stream captured by the second camera.

5. The method of claim 4, wherein the first hand gesture occurs within a predefined area of the second video stream captured by the second camera.

6. The method of claim 4, wherein identifying the first gaze comprises determining that the user is looking into the first camera.

7. The method of claim 1, wherein:

the preconfigured command mode is a user hand gesture mode;

the first camera is in a communication mode; and the second camera is in a control command mode.

8. The method of claim 1, wherein the indication of the command comprises a first hand gesture by the user identified in the second video stream captured by the second camera.

9. The method of claim 8, wherein the first hand gesture occurs within a predefined area of the second video stream captured by the second camera.

10. A non-transitory computer-readable medium storing processor-executable instructions configured to cause one or more processors to:

initiate, by a client device, a virtual meeting to which a plurality of client devices are connected, wherein the virtual meeting is configured with a designation of a user of the client device as either a hearing-impaired user or a sign language interpreter;

determine, by the client device, an indication of a command corresponding to a preconfigured command mode, wherein:

the client device comprises a dual camera configuration, the dual camera configuration comprising a first camera and a second camera, the first camera and the second camera each connected to the client device; and the indication comprises at least one of a user gaze or a gesture by the user captured in either a first video stream captured by the first camera or a second video stream captured by the second camera; and update one or more configurations of the virtual meeting based on the indication of the command.

11. The non-transitory computer-readable medium of claim 10, wherein:

the preconfigured command mode is a user gaze mode; and the indication of the command comprises:

a first gaze by the user identified in the first video stream captured by the first camera; and a first hand gesture by the user identified in the second video stream captured by the second camera.

12. The non-transitory computer-readable medium of claim 11, wherein:

the first hand gesture occurs within a predefined area of the second video stream captured by the second camera; and identifying the first gaze comprises determining that the user is looking into the first camera.

13. The non-transitory computer-readable medium of claim 10, wherein:

the preconfigured command mode is a user hand gesture mode;

the first camera is in a communication mode;

the second camera is in a control command mode; and the indication of the command comprises a first hand gesture by the user identified in the second video stream captured by the second camera.

14. The non-transitory computer-readable medium of claim 13, wherein the first hand gesture occurs within a predefined area of the second video stream captured by the second camera.

15. A system comprising:

one or more non-transitory computer-readable media; and one or more processors communicatively coupled to the one or more non-transitory computer-readable media, the one or more processors configured to execute processor-executable instructions stored in the non-transitory computer-readable media to:

initiate, by a client device, a virtual meeting to which a plurality of client devices are connected, wherein the virtual meeting is configured with a designation of a user of the client device as either a hearing-impaired user or a sign language interpreter;

determine, by the client device, an indication of a command corresponding to a preconfigured command mode, wherein:

the client device comprises a dual camera configuration, the dual camera configuration comprising a first camera and a second camera, the first camera and the second camera each connected to the client device; and the indication comprises at least one of a user gaze or a gesture by the user captured in either a first video stream captured by the first camera or a second video stream captured by the second camera; and update one or more configurations of the virtual meeting based on the indication of the command.

16. The system of claim 15, wherein:

the preconfigured command mode is a user gaze mode; and the indication of the command comprises:

a first gaze by the user identified in the first video stream captured by the first camera; and a first hand gesture by the user identified in the second video stream captured by the second camera.

17. The system of claim 16, wherein:

the first hand gesture occurs within a predefined area of the second video stream captured by the second camera; and identifying the first gaze comprises determining that the user is looking into the first camera.

18. The system of claim 15, wherein:

the preconfigured command mode is a user hand gesture mode;

the first camera is in a communication mode;

the second camera is in a control command mode;

the indication of the command comprises a first hand gesture by the user identified in the second video stream captured by the second camera; and the first hand gesture occurs within a predefined area of the second video stream captured by the second camera.

* * * * *